June 27, 1961 S. L. L. CAILLIOT 2,990,182

RECORDING AND REPRODUCING APPARATUS FOR A HELICOID RECORDING SURFACE

Filed June 25, 1957 4 Sheets-Sheet 1

June 27, 1961 S. L. L. CAILLIOT 2,990,182

RECORDING AND REPRODUCING APPARATUS FOR A HELICOID RECORDING SURFACE

Filed June 25, 1957 4 Sheets-Sheet 2

June 27, 1961 S. L. L. CAILLIOT 2,990,182

RECORDING AND REPRODUCING APPARATUS FOR A HELICOID RECORDING SURFACE

Filed June 25, 1957 4 Sheets-Sheet 3

2,990,182

RECORDING AND REPRODUCING APPARATUS FOR A HELICOID RECORDING SURFACE

Serge Léon Louis Cailliot, 53 Avenue Aristide Briand, Montrouge, France

Filed June 25, 1957, Ser. No. 667,912
Claims priority, application France June 26, 1956
13 Claims. (Cl. 274—4)

The present invention relates to the recording of sounds and images for the purpose of their reproduction.

In general, for the reproduction of sounds or cinematographic or television reproduction of images, there have been used heretofore bands, films or tapes of great length which are unwound from a supply spool and received on a take-up spool. Between the two spools the base passes into a recording or reproducing device (magnetic head if it concerns a magnetophone type of apparatus, recording or projecting apparatus if it concerns the cinema, for example). In any case, the recording or reproducing apparatus is bulky owing to the presence of the two spools.

Further, the virgin or blank base which is to receive or has received the recording is not very easy to handle owing to its great length and, in particular, in the case of a magnetophone tape or band comprising several side by side recording tracks, it is not easy to pass from one track to another or to return from one point of a track to another distant point on this track, since in both cases the operation necessitates unwinding a sometimes great length of recording band.

The purpose of the present invention is to remove the drawbacks inherent in use of recording bands of great length, such as the large size of the apparatus and the difficulty of passing from one track to another or from one point to another on the same track.

One object of the invention is to provide as a new industrial product, on one hand, a virgin base for recording, characterized in that it comprises a flexible, very thin band which is capable of receiving the desired recording and is coiled on itself in the form of a helical band or helicoid the coils of which are capable of subsidizing so that they bear against one another owing to the flexibility of the band, the thickness of the helical band ordinarily being equal to the sum of the thickness of its coils; and on the other hand, the same base but which has received a recording, that is, comprises a number of recordings extending in side by side relation along the length of the helical band.

The recordings may be:

(*a*) Magnetic sound recordings, in which case the band is formed in the known manner for conventional magnetic tapes or bands, that is, it comprises a base of plastic material covered with a layer capable of being magnetized.

(*b*) Magnetic image recordings in particular for television transmission, the base being in this case of the same type as that mentioned in paragraph (*a*).

(*c*) Optical sound recordings, in which case the base is similar to that for cinema films, that is it comprises a transparent band covered with a layer of light-sensitive emulsion.

(*d*) Sound recording in the form of a groove, in which case the base is capable of being cut or embossed; for example, it is composed of plastic material.

(*e*) Photographic image recordings, in which case the base is of the aforementioned type comprising a transparent band rendered light sensitive.

Another object of the invention is to provide methods of manufacturing the aforementioned band.

One of these methods comprises taking discs having a central aperture, cutting the discs along a line extending from the periphery to the central aperture and assembling the discs in such manner that each edge of the slit of each disc is connected to one of the edges of the slit of one or the other of the two adjacent discs between which the disc is placed.

According to other methods, the band is obtained in continuous manner by rolling a band between two rolls having concurrent axes, or drawing the band on a cone, or extruding a plastic material through an extruding die having a trapezoidal cross-sectional shape.

A further object of the invention is to provide apparatus for using the base of the invention and in particular a recording and reproducing apparatus comprising in combiation: a fixed deck, a support provided on said deck for receiving at least one helical band which is to receive or carries recordings, a recording or reproducing head, a support device for carrying said head, and means for effecting between said head and said support, and in consequence said helical band, a relative movement of rotation about the axis of the helical band, whereby in the course of recording or reproduction, there is a relative movement between said head and said helical band along one of the theoretical helices of the latter, said head being disposed at each instant between the coils of said helical band, which coils continuously pass on either side of said head.

In a preferred embodiment, the support for the helical band rotates and the head is stationary during said recording or roproducing operation.

According to another preferred feature, the support device for the head is so adapted that the latter can be withdrawn, by moving it in a direction perpendicular to the axis of the helical band, from the superimposed coils between which it is engaged, and brought back against one of the end of the helical band in passing round the periphery of the latter, the head travelling through a substantially U-shaped path.

Further features and advantages of the invention will be apparent from the ensuing description with reference to the accompanying drawings, to which the invention is in no way limited.

(I) BASES

Figure 1:
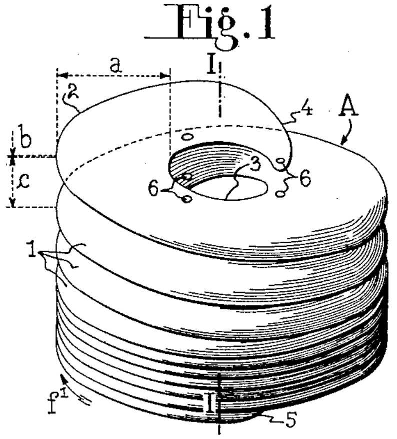
FIG. 1 is a diagrammatic perspective view of a virgin base embodying the invention.

In the embodiment shown in FIG. 1 the new industrial product embodying the invention comprises a band A which is wound in the form of a helicoid having an axis I—I and a number of coils 1, this number being, if desired, relatively great, for example as much as a hundred or more.

This band is composed of one of the materials mentioned hereinefore and has one face provided with a magnetic, optical or mechanical recording layer, and a radial width *a* from the peripheral edge 2 to the edge 3 of a central aperture, the latter having in the presently-described embodiment a constant diameter.

The width *a* may be, for example, about 8 to 10 cm. The thickness *b* of the band is very small, for example about 0.2 mm., which if there are 100 coils, gives, when the latter are stacked against one another (which occurs automatically owing to effect of gravity on the flexible band) an overall thickness of 2 cm. for the ring which the helical band ordinarily forms when the coils lie flat against one another.

It will be observed that the first coils have been separated from one another in FIG. 1, but it is obvious that the pitch *c* of these coils is variable from a minimum value, equivalent to the thickness *b* when the coils are in touching relation, up to a relatively great value, the helical band being capable of undergoing great deformations owing to the extreme flexibility of its material.

This band terminates in two ends 4 and 5 which may have any direction and shape, such as rectilinear and radial, or substantially curved.

Preferably, the base just described comprises in each coil, in the vicinity of the central aperture 3, a number of apertures 6 which are in superimposed relation when the coils lie flat against one another to permit introduction of pins which permit driving the recording base A in the direction of arrow $f^1$ in the presently-described embodiment, first in the course of recording and then in the course reproduction of the recording of the base.

It is obvious that the direction in which the helical band is coiled may be left, in which case it rotates in a clockwise direction (arrow $f^1$), or right, in which case it rotates in a counter-clockwise direction.

Figure 2:
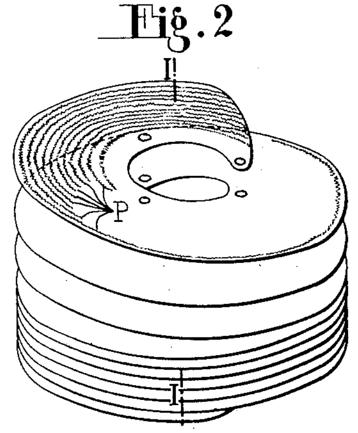
FIG. 2 is a similar view of the same base after recording.

FIG. 2 shows the base after recording. This base comprises a number of recorded tracks P in side by side relation. The number of these tracks depends of course on the type of recording and on the width *a*.

If these tracks are magnetic or optical tracks corresponding to sound recordings, each of these tracks has the conventional width of around 1 to 2 mm. and the tracks are spaced a short distance apart, thus, for an 8 to 10 cm. wide band, about 20 tracks could be easily recorded.

If it concerns a cut or embossed recording, an even greater number of tracks could be provided.

If it concerns a cinema film, the number of rows of images or frames would of course be determined by the required size of the images.

In any case, each track extending from the end 4 to the end 5 of the band has a great length in view of the great number of coils. Thus in the case of a track whose distance from the axis I—I is 10 cm. and for a helical band having 100 coils, the track length would be $2\times3.1416\times10\times100=6283$ cm., namely equivalent to a band more than 60 m. long.

Figure 3:
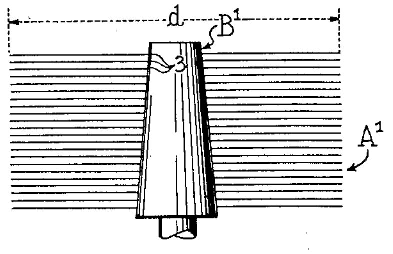
FIG. 3 is a diametral axial sectional view of a modification of the base.

FIG. 3 shows a modification $A_1$ of the base embodying the invention, in which the width of the band varies from one end thereof to the other, so that, when the coils rest against one another, the outside diameter *d* is constant whereas the central aperture 3 is tapered, its diameter increasing from one end of the band to the other.

This embodiment does not include the driving apertures 6, since the band is automatically driven in rotation by the engagement of the base $A_1$ on a conical driving member $B_1$ which both drives the band and slightly separates the coils, the separation depending on the taper of the conical member.

Figure 4:
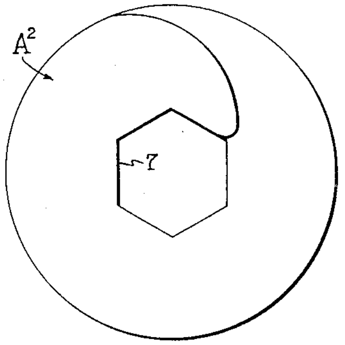
FIG. 4 is a plan view of another modification of the base.

FIG. 4 shows another modification $A_2$ of the base embodying the invention, in which, for the purpose of driving the band, each coil comprises a polygonal central aperture 7, for example a hexagonal aperture, so that when the coils bear against one another a prismatic central aperture or bore is formed.

The helical bands forming the bases described hereinbefore may be obtained in various ways.

(II) METHODS OF MANUFACTURING BASES

Figure 5:
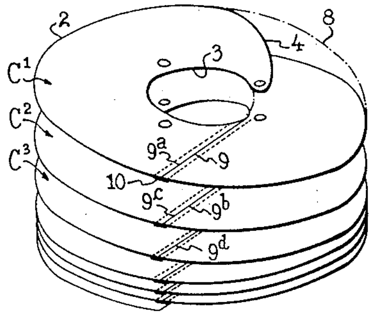
FIG. 5 is a diagram showing a method of manufacturing the base shown in FIGS. 1 and 2.

FIG. 5 shows a simple method which consists in starting with flat discs provided with central apertures and splitting these discs from their periphery 2 to their central aperture 3. FIG. 5 shows three discs $C^1$, $C^2$, $C^3$ which are adapted to form the first coils of the helical band A.

The first disc $C^1$ is divided into two parts, one of which is in full line and forms the start of the base, whereas the other part 8, in dot-dash line, is removed, the disc being cut along a first straight line 9, which extends from the edge 2 to the edge 3, and along a curved line 4 adapted to form one of the aforementioned ends of the band.

Each of the other discs $C^2$ and $C^3$ is provided with a single cut or split similar to the cut 9 of the first disc $C^1$ extending from the outer edge to the inner edge, the cut formed in each disc being preferably rectilinear and substantially oblique relative to a radius, for example advantageously tangent to the inner edge 3.

Each disc is thereafter put into the form of a helical coil and the two edges of the cut formed therein, namely the edges $9^a$ and $9^b$ of the disc $C^2$ and $9^c$ and $9^d$ of the disc $C^3$, are each connected by adhesive means to one of the edges of the cut in the adjacent disc. Thus, as shown in FIG. 5 the edge $9^a$ of the disc $C^2$ is connected to the edge 9 of the disc $C^1$ whereas its edge $9^b$ is connected to the edge $9^c$ of the disc $C^3$.

This procedure is very simple and could be very advantageously adopted for magnetic or mechanical cut recordings, since the discs could be interconnected without much increase in thickness by adhesive bands 10 applied to the face of the helical band opposite that intended to receive the recording.

In the embodiment shown in FIG. 5, for the sake of clarity all the cuts have been shown in the same radial axial plane, but it will be clear that they could be disposed in different axial planes so as to avoid concentrating the slight thickening due to the strips 10 in one spot.

Figure 6:
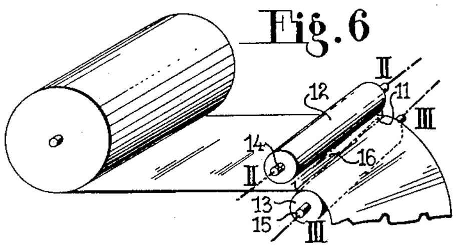
FIG. 6 is a diagrammatic perspective view of a mill for manufacturing the base.

FIG. 6 shows diagrammatically another method of obtaining the helical base of the invention, this method consisting in rolling a band having a rectangular cross-section 11 between two rolls 12 and 13 which rotate in bearings 14 and 15 disposed in such manner that the axes II—II and III—III of these rolls are slightly convergent so that the rolling action imparts to the initial rectangular cross-section 11 a slightly trapezoidal shape 16 which automatically results in the desired helical coiling of the band.

Figure 7:
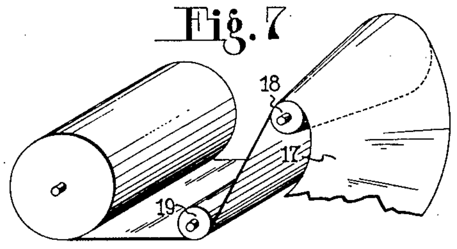
FIG. 7 is a diagrammatic perspective view of another method of manufacturing the base.

A similar result could be obtained in drawing or stretching an initially rectilinear band 17 (FIG. 7) on a conical roll 18, the band being continuously unwound from a supply roll 19.

Again, if it is desired, the base of the invention could be obtained by extruding it through an extruding die having a trapezoidal cross-sectional shape.

(III) Description of a recording and reproducing apparatus utilizing the helical base FIGS. 8 to 12 show an embodiment of an apparatus which may be used for recording and reproducing sounds by means of respectively a virgin and blank base of the type shown in FIG. 1 and the same base provided with recordings as shown in FIG. 2.

In this embodiment of the apparatus, the latter comprises a case consisting of a body 21 and a cover or lid preferably in two parts 22, 23 which are pivotably mounted by hinges 24 on a vertical partition wall 24$^a$. Disposed in the case and resting on battens 25$^a$, is a deck 25 adapted to support the various devices and mechanisms.

In the presently-described apparatus ,the base or helical band A which is to receive recordings or has already received recordings, is adapted to be disposed horizontally, that is, with its axis I—I vertical.

Figure 8:
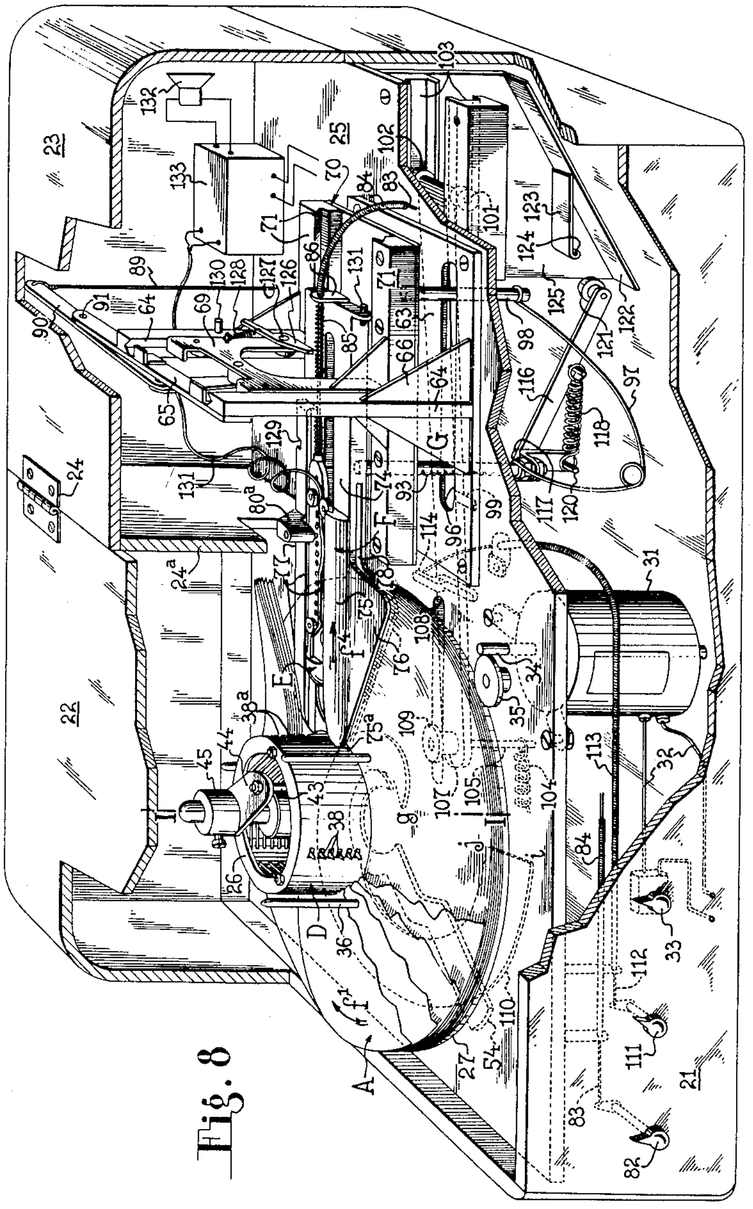
FIG. 8 is a perspective view, with parts cut away, of a sound recording and reproducing apparatus utilizing the base in the form of a helical band.

The apparatus comprises four main parts:

(*a*) A rotatable support D provided with driving means for rotating the band A in the direction of arrow $f^1$ (FIG. 8).

(*b*) A recording and/or reproducing head E.

(*c*) A support device F for this head.

Figures 9, 13:
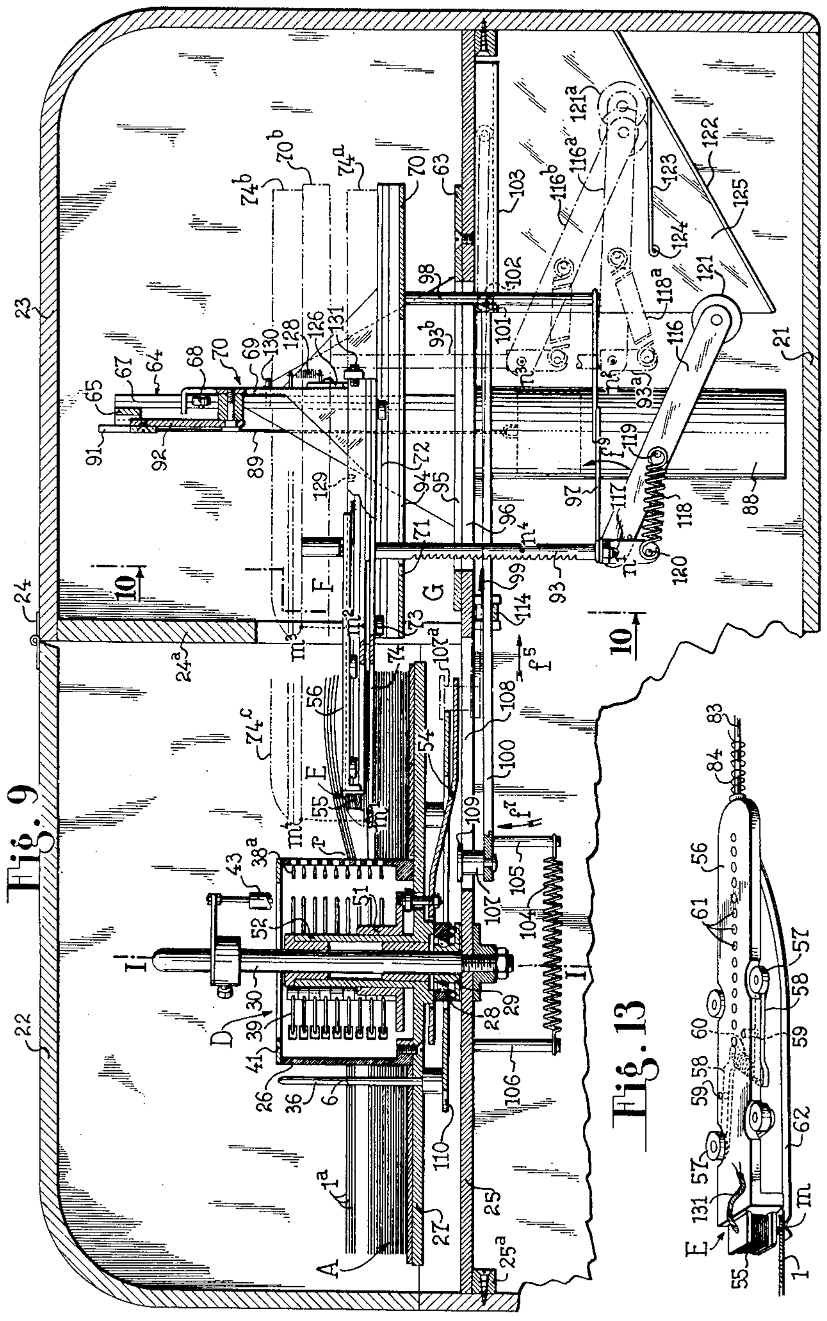
FIG. 9 is a longitudinal sectional view of said apparatus in its recording or reproducing position.
FIG. 13 is a perspective view of the adjustable recording and reproducing head.

(*d*) A mechanism G for imparting to the device F and the head E a movement in the course of which the head is moved along a U-shaped path in a vertical plane coinciding with the plane of FIG. 9.

A description will now be given of each of these parts of the apparatus.

*Support D for the band A*

This support is adapted to receive the band A shown in FIGS. 1 and 2 provided with a central aperture 3 of constant diameter. The support comprises a hollow cylindrical hub 26 provided with a circular base plate or turntable 27 whose outside diameter is slightly greater than the outside diameter of the helical band A. The turntable 27 rests through a thrust ball-bearing 28 on a collar 29 engaged on a vertical journal 30 having an axis I—I.

The band is rotated through the medium of the turntable 27 by an electric motor 31 (FIG. 8) the supply circuit 32 of which is controlled by a switch button 33. The axis 34 of the motor frictionally drives a pulley 35 which is frictionally engaged with the periphery of the turntable 27.

Fixed to the base 27 and disposed equal distances from and parallel with the axis I—I, are pins 36 adapted to extend through the helical band A through the apertures 6 so that the band A is connected to the support D as concerns rotation.

The cylindrical wall of the hub 26 comprises, for example, three rows of apertures 37 parallel with the axis I—I, and fingers 38 extend through these apertures outwardly of the hub (see in particular FIGS. 8 and 12) for supporting the coils of the helical band A located above the head E. Each of these fingers is provided at the end of an arm 39 pivotably mounted on a fixed spindle 40 which is carried at its lower end by the turntable 27 and at its upper end by a flange 41 provided on the hub 26. Each finger 38 is biased outwardly of the hub by the action of a spring 42. There are as many springs 42 as there are arms 39. In order to render the drawing more clear, only one of these springs has been shown in FIG. 11. Thus each finger 38 is capable of protruding from the hub independently of the other fingers.

Figures 11, 12:
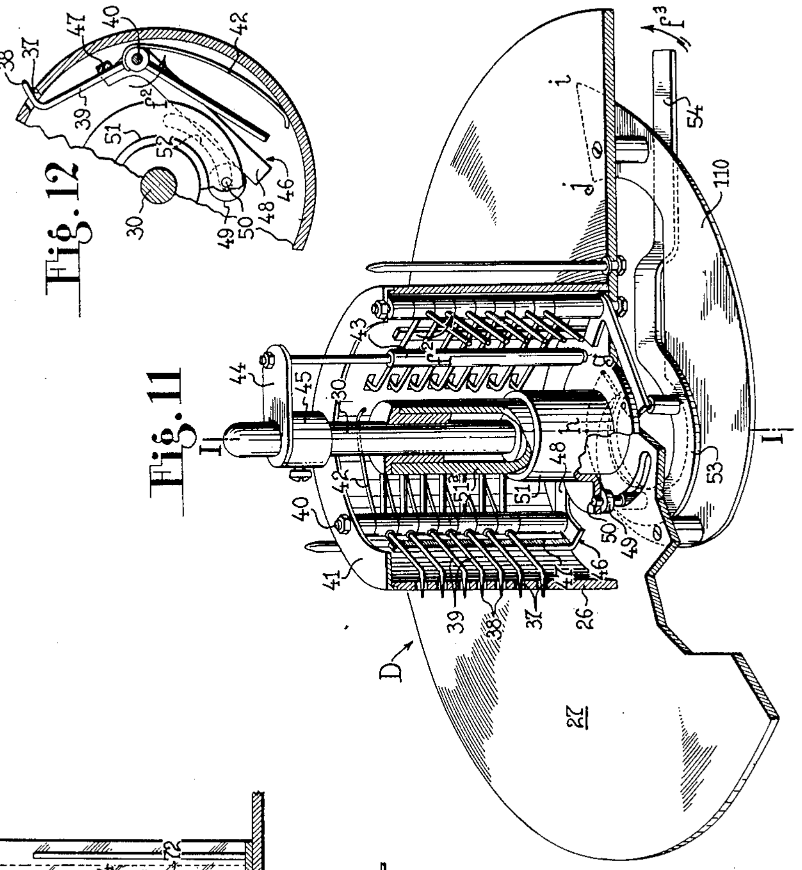
FIG. 11 is a perspective view of the support device forming the support for the helical band after or before recording and the associated devices combined with this support device.
FIG. 12 is a partial plan view of said support device.
Figure 10:
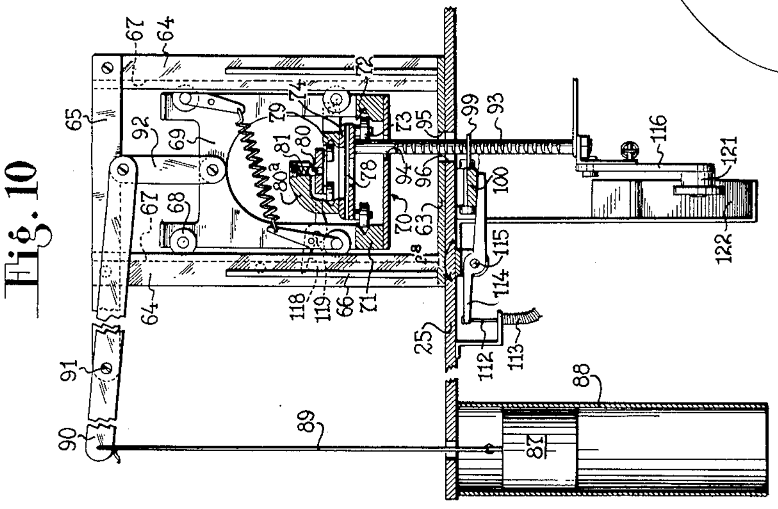
FIG. 10 is a partial vertical cross-sectional view taken along line 10—10 of FIG. 9.

To withdraw each row of fingers to the position 38$^a$ within the hub 26 (FIGS. 8 and 9) when they pass by the head, a longitudinal abutment 43 is disposed in the hub and fixed in position by a strip 44 and a collar 45 mounted on the journal 30 (FIGS. 8, 9 and 11). The abutment or rod 43 causes all the arms mounted on the same spindle 40 to pivot simultaneously in the direction of arrow $f^2$ (FIG. 11) owing to the engagement of the rear ends of these arms with this abutment 43 during rotation of the support D. The fingers 38 are not withdrawn instantaneously but they start to withdraw just before reaching the plane of FIG. 9 and resume their protruding position only a little after having passed through this plane.

The device consisting of the fingers 38 and their abutment 43 is completed by an auxiliary device which permits effecting at a given moment, referred to hereinafter, a simultaneous withdrawal of all the fingers. Pivotably mounted on each spindle 40 carrying the arms 39 is an auxiliary L-shaped lever generally indicated by the reference numeral 46. The lever comprises a first branch 47 parallel with the axis I—I and disposed between the wall of the hub 26 and the finger-carrying parts of the arms 39 (FIGS. 11 and 12.) The other branch 48 of the lever 46 is disposed horizontally above the turntable 27 in such manner as to be encountered by a roller 49 which pivots it in the direction of arrow $f^2$ (FIGS. 11 and 12) about the spindle 40. The rollers 49 corresponding to the various levers 46 rotate freely on pins 50 carried by a lower flange of a sleeve 51. The latter is engaged on a tube 51$^a$ rigid with the turntable 27 and this tube is rotatably mounted on the journal 30. The pins 50 extend through arcuate slots 52 which are formed in the turntable 27 and are concentric with the axis I—I, the pins 50 being fixed to an arcuate portion 53 of a lever 54 under the turntable 27. Swinging the latter in the direction of arrow $f^3$ about the axis I—I relative to the turntable 27 (FIG. 11), as explained hereinafter, causes rotation of the rollers 49 about this axis and causes the branch 48 of each lever 46 to swing about the corresponding spindle 40 in the direction of arrow $f^2$ so as to effect withdrawal of all the fingers 38. Further reference will be made to the operation of the lever 54 hereinafter.

*Recording or reproducing head E*

In the presently-described embodiment, this head is a magnetic recording and reproducing head. The head E is of conventional type. It comprises (see in particular FIG. 13) the head proper 55 attached to the end of a support 56 in the form of an elongated plate forming a carriage. For this purpose, the plate 56 is provided with rollers 57, preferably resiliently mounted by attachment to arms 58 which swing about pins 59 secured to the plate 56 and are urged outwardly by the action of springs 60. The plate 56 is provided with a row of apertures 61 the function of which will be explained hereinafter. Fixed under the plate 56 is a resilient strip 62 adapted to resiliently grip one of the coils 1 of the helical band A between the head 55 and the strip 62, so that the head 55 exerts a slight yieldable pressure against this coil.

*Support device F for the head E*

This support device comprises a first stationary guide fixed to the deck 25 and consisting of a base 63 secured to the deck and two uprights 64 braced at their upper ends by a transverse member 65 (see in particular FIGS. 8 and 10) and supported at their lower ends by brackets 66.

Provided on the edges of the uprights 64 in opposite relation are two recesses or grooves 67 which form a first guide parallel with the axis I—I of the rotating support D. Slidable in this guide through the medium of preferably resiliently-mounted rollers 68, is the vertical branch 69 of a carriage which is generally indicated by the reference numeral 70 and comprises another horizontal branch 71. The upper side of the latter is provided with two longitudinally extending lateral ribs in which are are formed recesses 72 forming a second guide the centre line of which is perpendicular to the axis I—I.

Slidable in the second guide through the medium of rollers 73 (FIGS. 9 and 10) is a head carrier 74 which has, adjacent the support D, a flat portion in a horizontal plane. Its middle portion is raised at 75 relative to lateral fins 76 (FIG. 8) and terminates in the form of an ogive 75$^a$ adapted to facilitate its insertion between two coils of the band A. This flat end portion of the carrier 74 is in the form of a double fork member due to the provision of a vertical middle aperture or slot 77 and a slit 78 (see in particular FIGS. 8 and 10) to allow free passage of the coil of the helical band A when recording or reproducing.

The head carrier 74 comprises on the lateral faces of the aperture 77 two recesses 79 in which the rollers 57 of the head E roll.

The head E is adjustable in position along the recesses or runways 79 of the head carrier 74 for the purpose of selecting the track P (FIG. 2) to be recorded or reproduced. The head E is ordinarily held stationary on the head carrier by means of a ball 80 (FIG. 10) housed in a recess in a boss 80$^a$ carried by the carrier 74 and urged by the action of a spring 81 into one of a series of apertures 61 provided in the plate 56 of the head E (FIG. 13).

The selection of the track is obtained by moving the head E in opposition to the action of the locking ball 80 by means of a control knob 82 (FIG. 8) connected by a cable 83 to the head E. The latter is moved in the direction of arrow $f^4$ (FIG. 8) in opposition to the action of a return spring 85 encompassing the cable 83 and disposed between the end of the strip 56 and an abutment 86 fixed to the head carrier 74.

*Actuating mechanism G*

This mechanism actuates the support device F.

Means are provided for urging the carriage along the fixed guide 67 in such direction and with such force that the head proper 55 of the head E is lightly pressed against the coils disposed between the head and the turntable 27 of the rotating support. These means consist in the weight of the carriage and of the devices supported thereby. This weight acts in a direction to urge the head against the helical band A, but the force exerted thereby is nevertheless diminished by a weight 87 (FIG. 10) which slides in a tube 88 secured to the deck 25 and is connected by a cable 89 to a lever 90 pivotably mounted at 91 on an extension of the cross-member 65 and connected by a link 92 to the carriage 70.

Fixed below the carrier 74 is a rigid rack 93 which is parallel with the axis I—I and has teeth which are directed toward the latter and pass freely through a series of apertures formed respectively at 94 (FIGS. 9 and 10) in the horizontal branch 71 of the carriage 70, at 95 in the plate 63 and at 96 in the deck 25.

Fixed adjacent the bottom end of the rack 93 is a first return spring 97 which is, for example, hair-pin shaped and is supported by a rod 98 carried by the carriage 70. The spring 97 urges the carrier 74, and in consequence the head E, toward the rotating support D. The rack 93 co-operates with a knife-edge abutment 99 carried by a push bar 100. At its right end (as viewed in FIGS. 8 and 9) the bar is pivotable about a journal 101 carried by two rollers 102 capable of rolling in two runways 103 which are secured under the deck 25 and are parallel with the runways 72 of the carriage 70. The bar 100 is therefore capable of rolling in the direction of arrow $f^5$ (FIG. 9) and in the opposite direction, and of pivoting about the axis of the journal 101 in the direction of arrow $f^7$ and in the opposite direction. It is biassed toward the left (as viewed in FIG. 9) by a spring 104 which is connected to a pin 105 provided on the bar 100 and to a pin 106 fixed under the deck 25. In the vicinity of the pin 105, the bar 100 carries a roller 107 which, in the course of the longitudinal movements of the bar 100, rolls in an aperture or slot 108 formed in the deck 25.

The push bar 100 ordinarily occupies its lower position shown in FIG. 9 relative to the axis of the journal 101 and is supported by the fact that a flange 109 on the roller 107 bears against the upper face of the deck 25. This push bar may be swung upwardly in the direction of arrow $f^7$ so that the roller 107 is put in line with a came 110 which rotates with the support D. The cam 110 comprises an outer cam edge in the form of a spiral *ghi* (FIG. 11), the end *i* of the spiral portion being followed by a drop *ij*.

It will be understood that when the bar 100 is in the position shown in FIG. 9 (in which position it is held by the action of the spring 104), if it is raised so that the roller 107 is placed in line with the cam 110, the latter will encounter the roller 107 in the course of its rotation at a point such as *h* (FIG. 11) in the vicinity of the end *g*. The portion *hi* of this cam will cause the bar 100 to move in the direction of arrow $f^5$ in opposition to the action of the spring 104. The abutment 99 is almost immediately engaged between two teeth of the rack 93 and the latter is urged toward the right in opposition to the action of the spring 97, the head carrier 74 and the head E moving therewith.

The bar 100, under the effect of the force of gravity, tends to assume the disengaged position shown in FIG. 9. To swing it upwardly in the direction of arrow $f^7$ so as to bring the roller 107 in line with the cam 110, a control device is provided comprising a knob 111 which is mounted on the front face of the apparatus and is connected by a cable 112 in a sheath 113 (FIGS. 8 to 10) to a rocker 114 pivotable about a pin 115 carried by the deck 25. This rocker bears at its free end against the lower face of the bar 100. Thus, it is merely necessary to rock the rocker 114 in the direction of arrow $f^8$ (FIG. 10) by means of the knob 111 to raise the bar 100.

In order to raise the movable assembly formed by the carriage 70, the head carrier 74 and the head E, at the end of the travel toward the right of the rack 93, the head carrier and the head, there is provided a resiliently yieldable device which is automatically put under tension in the course of this movement toward the right of this assembly. This resilient device comprises a lever 116 (FIGS. 8 and 9) pivoted at 117 adjacent the lower end of the rack 93, and a spring 118 connecting an intermediate point 119 on this lever to the end 120 of the rack. The lever 116 carries at its free end a roller 121 which, in the course of the movement toward the right of the aforementioned movable assembly rolls along a fixed ramp 122 which is fixed under the deck 25 and causes the lever 116 to move upwardly in the direction of arrow $f^9$ (FIG. 9) so that it assumes the extreme position 116$^a$ shown in dot-dash line in FIG. 9, the spring 118 being then in extended position as shown at 118$^a$ so that it tends to pivot the lever 116 downwardly. Disposed above the ramp 122 is a plate 123 which forms a pawl pivoted at 124 on the bracket 125 supporting the ramp 122. This pawl allows free passage of the roller when the latter moves upwardly but prevents downward movement thereof. As the roller 121 cannot move downwardly when it has reached its position 121$^a$ on the ramp 122, the downward pivoting movement of the lever 116 relative to the rack 93, caused by the action of the spring 118, results in an upward swinging movement of the lever 116 about the centre of the roller 121$^a$ and the raising of the rack from the lower extreme position 93 to the upper extreme position 93$^b$, the devices connected to the rack moving therewith. However, this upward displacement is only possible if the rack 93 is disengaged from the abutment 99, but this disengagement can only occur at the end of the travel toward the right of the aforementioned movable assembly (74—93—E) when roller 107 on the bar 100 encounters the drop *ij* of the cam 110 and the bar 100 moves toward the axis I—I, as will be explained hereinafter.

For the purpose of ensuring a perfectly vertical displacement of the rack 93 from the position 93$^a$ to the position 93$^b$, there is provided a locking device adapted to temporarily maintain the carrier assembly 74 in its extreme right position 74$^a$ (FIG. 9). This device comprises a locking member 126 which is pivoted at 127 to the vertical branch 69 of the carriage 70 and is urged by the action of a spring 128 in a direction to engage a recess 129 provided in the carrier 74 in such position that it is in line with this locking member 126 in the extreme right position 74$^a$ of the carrier.

To release the carrier from the locking member 126, when the spring 118 has shifted it to the upper position 74$^b$, and to allow it to resume under the effect of the spring 97 the final left position 74$^c$ (FIG. 9), the upright 64 carries an abutment 130 which disengages the locking member 126.

At the right end of the carrier 74 there is provided an adjustable abutment 131 adapted to abut the vertical branch 69 of the carriage 70 and limit the displacement toward the left of the carrier 74 caused by the force exerted by the return spring 97.

(IV) OPERATION OF THE APPARATUS

Before describing the general operation of the apparatus in the course of recording or reproduction, a complete displacement of the head carrier 74 will be described, the apparatus being assumed unloaded.

In its initial position, the carrier is in the position 74 and the point $m$ (FIG. 13) of the head 55 adapted to engage the helical band is in position $m^1$ (FIG. 9). By closing the switch 33, the motor 31 is started up and rotates the support D in the direction of arrow $f^1$. Then, by acting on the knob 111, the rocker 114 is rocked in the direction of arrow $f^8$ (FIG. 10) and it raises the bar 100 and thus brings the roller 107 in line with the cam 110. This cam moves in the direction $ghi$ against the the roller 107 and thenceforth holds the bar in its raised position by engagement with the flange 109 so that knob 111 can be released. The cam urges the push bar 100 in the direction of arrow $f^5$ in position to the action of the return spring 104. After a small displacement, the abutment 99 engages between two teeth of the rack 93 and thenceforth the bar 100 urges toward the right not only the rack 93 nut also the devices connected thereto, and in particular the head carrier 74 and the head E, while putting under tension both the return spring 97 and the spring 118 due to the rolling of the roller 121 along the upwardly inclined ramp 122. It will be observed that the roller 121 easily passes through the pawl 123 by moving it upwardly.

The bar 100 thus brings the rack 93 to position 93$^a$ and the carrier 74 to position 74$^a$, in which position the locking member 126 drops into the recess 129. The point $m^1$ assumes position $m^2$ in travelling through a horizontal path $m^1m^2$. Shortly after, the drop $ij$ of the cam 110 passes in front of the roller 127 of the bar 100 and releases the latter and, owing to the action of the spring 104, the bar 100 moves toward the support D. Owing to this movement of the bar 100, the abutment 99 is withdrawn from the rack 93 and the latter is released. The spring 118, which was compressed at 118$^a$, is now free to extend and, owing to the fact that the roller 121$^a$ is held by the pawl 123, causes the lever 116$^a$ to swing to position 116$^b$ and this results in a vertical displacement of the rack 93 from position 93$^a$ to position 93$^b$, the devices connected to the latter as concerns vertical movement moving therewith.

The carrier 74 therefore moves from position 74$^a$ to position 74$^b$, the carriage moving from position 70 to position 70$^b$. The point $m$ is moved upwardly from position $m^2$ to position $m^3$.

When the carriage reaches the position 70$^b$, the locking member 126 encounters the pin 130 which causes it to withdraw from the recess 129 and release the assembly comprising the carrier 74, the rack 93 and the head E. The spring 97 extends and therefore tends to move the assembly toward the left. It will be observed that during the extension of the spring 97, the carriage 70 cannot move downwardly because the roller 121 rolls along the pawl 123. Further, any downward movement of the carriage 70 would cause the lever 116 to pivot from position 116$^b$ to position 116$^a$, that is, would cause the spring 118 to be put under tension. Thus this spring opposes a downward movement of the carriage. The head carrier 74 therefore moves horizontally and reaches the upper position 74$^c$ which is determined by the fact that the abutment 131 encounters the branch 69 of the carriage. The point $m$ moves from position $m^3$ to position $m^4$.

It is only when the carrier reaches the position 74$^c$ that the movable assembly can move downwardly again under the effect of its slightly greater weight in relation to that of the weight 87, since at this moment the roller 121 leaves the pawl 123. The point $m$ therefore tends to move downwardly from position $m^4$ toward position $m^1$. As can be seen, this point $m$ therefore travels through a U-shaped path $m^1$ . . . $m^4$ in the course of the movement and the same is true for other points connected thereto, for example the centre of the pivot 117 which travels through the path $n^1$, $n^2$, $n^3$, $n^4$.

It will be observed that just before the end of the movement toward the right of the bar 100, the roller 107 reaches the position 107$^a$ in which position it causes the end of the lever 54 (FIG. 11) to pivot in the direction of arrow $f^3$, which results in a temporary withdrawal of all the finegrs 38 into the hub 26.

Let it now be assumed that a virgin or blank helical band or base A is to receive a recording. In order to place this band on the turntable 27 of the support D, it is necessary to withdraw the head carrier 74 so that the point $m$ assumes substantially the position $m^2$ and, furthermore, the fingers 38 should all be withdrawn to position 38$^a$ within the hub 26. To do this, the device D is rotated manually while the push bar 100 is held in its raised position by means of the knob 111. An unloaded operational cycle of the apparatus commences and is stopped just before the roller reaches the portion $ij$ of the cam, that is, when the roller 107 is about to reach its extreme right position, and has swung the lever 54 in the direction of arrow $f^3$ and has thus withdrawn all the fingers 38.

The mechanism of the apparatus is temporarily held in position by hand. The helical band or base A is placed on the turntable 27 and a single rotation of the device D is completed, which automatically returns the head carrier 74 to position 74$^c$ and causes the fingers 38 to protrude from the hub 26, the lever 54 being disengaged from the roller 107, since the bar 100 has already reached the portion $ij$ of the cam 107 and is therefore disengaged from the latter.

Owing to the weight of the movable assembly, the head carrier 74 moves downwardly to position 74$^c$, just at the moment when the point $m$ encounters the first coil of the helical band A at the start of a theoretical helix, the choice of this helix depending on the position set for the head E on the head carrier 74 by means of the knob 82.

The apparatus is now ready for recording. The switch 33 is closed and the motor 31 thenceforth drives the support D in rotation in the direction of arrow $f^1$. The helical band moves past the recording head 55, the latter being located, as the band rotates, between successive coils thereof, the coils, such as those shown at 1$^a$ (FIG. 9), which have already received a recording and are disposed above the head E being supported by the protruding fingers 38.

As the sets of fingers come in line with the recording head, these fingers are withdrawn under the effect of the abutment 43 so as to permit the free upward displacement of the coils at $r$ (FIG. 9), the raised coils being thereafter supported by the fingers which protrude from the hub 26, almost immediately after, as explained hereinbefore. Thus the recording can be continued until the bottom end of the helical band is reached.

One recording track P (FIG. 2) has thus been produced. The other tracks are obtained in a similar manner by returning the head carrier 74 to position 74$^c$, at the end of the recording of each track, by the cycle of movements which was described hereinbefore and is obtained automatically by operating the knob 111 raising the pushbar 100.

To obtain a sound reproduction, a previously recorded helical band or base, such as that shown at A in FIG. 1, is placed in the apparatus in the manner described hereinbefore. The reproduction or playback of a given sound track is obtained in exactly the same manner as for recording, except that the conductors 131 from the head 55, instead of being connected to a microphone, are connected to a loudspeaker 132, for example through the medium of an amplifier 133. This loudspeaker and amplifier, shown diagrammatically in FIG. 8, may be incorporated in the apparatus if desired.

In the course of reproduction of the recording, it might be necessary to pass from one track to another or to return to an earlier part of the same track. In either case, this is obtained in causing the point $m$ of the head to travel through the path $m^1 \ldots m^4$, the point $m^4$ being left in line with the same track, if it concerns repeating the reproduction of a first portion thereof, or being offset to the right or to the left, as viewed in FIG. 9, if it concerns reproducing another track.

From the foregoing, it will be clear that the apparatus, and in particular the helical band or base, of the invention very readily permit this passage from one track to another or from one point to another of the same track, without any modification of the case carrying the recording. This is impossible with the known apparatus utilizing a band or tape which is unwound from a supply spool onto a take-up spool, since, with these apparatus, if it is desired to go back to the start of the track it is necessary to wind back the already unwound part of the spool. According to the present invention, this is obtained in merely causing the mechanism to move from $m^1$ to $m^4$.

Although specific embodiments of the invention have been described, many modifications and changes may be made therein without departing from the scope of the invention as defined in the appended claims.

The apparatus can be of a type other than that described hereinbefore. For example, instead of providing a rotating support D this support may be fixed, and in this case it is the recording or reproducing head which rotates about the axis I—I of the helical band, which is stationary. If desired, a plurality of helical bands or bases may be mounted on the fixed or rotating support, these bands receiving a recording or being used for reproduction by means of the same head which passes from one band to the other. The axis of the helical band or base placed in the apparatus may have a position other than vertical, for example horizontal. In the case of a light or optical recording or reproduction, the magnetic head would be replaced by a head having a recording source of light or a photo-electric reproducing cell. In the case of a mechanical recording or reproduction using a cut or embossed groove, a mechanical recording or reproducing head or pickup would be used.

Having now described my invention what I claim as new and desire to secure by Letters Patent is:

1. Apparatus for respectively recording and reproducing comprising: a very thin flexible recording band extending about an axis in the form of coils thereby providing a helicoid recording surface, said coils ordinarily resting horizontally stacked flat on one another in touching relation but being capable of separating from one another in a direction parallel with said axis owing to the flexibility of said band, a fixed deck, a rotatable support provided on said deck for supporting said band and driving the latter in rotation about said axis, a head for respectively recording and reproducing cooperable with said band, means for holding said head in position radially of said axis but permitting said head to move in a direction parallel with said axis, a driving device for rotating said support about said axis, and coil-separating means extending in a plane substantially perpendicular to said axis and combined with said head, whereby said coils are separated to allow passage of said head between said coils.

2. Apparatus for respectively recording and reproducing comprising: a very thin flexible recording band extending about an axis, in the form of coils thereby providing a helicoid recording surface, said coils ordinarily resting horizontally stacked flat on one another in touching relation but being capable of separating from one another in a direction parallel with said axis owing to the flexibility of said band, a fixed deck, a rotatable support provided on said deck for supporting said band and driving the latter about said axis, a head for respectively recording and reproducing cooperable with said band; means for holding said head in position radially of said axis but permitting said head to move in a direction parallel with siad axis, said means comprising a support device having a head carrier on which said head is adjustable in position whereby the radial position of said head relative to the band is adjustable; a driving device for rotating said support about said axis, and coil-separating means extending in a plane substantially perpendicular to said axis and combined with said head, whereby said coils are separated to allow passage of said head between said coils.

3. Apparatus for respectively recording and reproducing comprising: a very thin flexible recording band extending about an axis, in the form of coils thereby providing a helicoid recording surface, said coils ordinarily resting horizontally stacked flat on one another in touching relation but being capable of separating from one another in a direction parallel with said axis owing to the flexibility of said band, a fixed deck, a rotatable support provided on said deck for supporting said band and driving the latter about said axis, a head unit for respectively recording and reproducing cooperable with said band, said head unit comprising a head and a resiliently yieldable blade adapted to resiliently trap one coil of the band between said head and said blade; means for holding said head unit in position radially of said axis but permitting said head unit to move in a direction parallel with said axis; a driving device for rotating said support about said axis, said coil-separating means extending in a plane substantially perpendicular to said axis and combined with said head unit, whereby said coils are separated to allow passage of said head unit between said coils.

4. Apparatus for respectively recording and reproducing comprising: a very thin flexible recording band extending about an axis in the form of coils thereby providing a helicoid recording surface, said coils ordinarily resting against one another but being capable of separating from one another in a direction parallel with said axis owing to the flexibility of said band, a fixed deck, a support provided on said deck for supporting said band, and driving the latter in rotation about said axis, a head for respectively recording and reproducing cooperable with said band, a support device for holding said head in position radially of said axis but permitting said head to move in a direction parallel with said axis, a driving devce for effecting between said head and said support, and in consequence the band, a relative movement of rotation about said axis, and coil-separating means extending in a plane substantially perpendicular to said axis and combined with said head, whereby said coils are separated to allow passage of said head between said coils, said support device being so adapted and arranged that said head can be extracted by withdrawing said head, in a direction perpendicular to said axis, from the coils of said band between which said head is engaged, so that said head can be returned to a position in which it rests against one of the ends of said band by passing round the periphery of the latter, said head travelling through a substantially U-shaped path.

5. Apparatus as claimed in claim 4, wherein said support device is combined with an actuating device which is combined with said support for said band and is actuated by said actuating device, whereby said support causes said head to travel along said path.

6. Apparatus as claimed in claim 5, wherein said support device comprises a first guide fixed to said deck and extending in a direction parallel with said axis, an L-shaped carriage having two branches disposed at a right angle to one another, one of said branches of said carriage being movable along said first guide, the other of said branches forming a second guide perpendicular to said axis, and a head carrier movable in said second guide.

7. Apparatus as claimed in claim 6, wherein said support comprises a base plate and said actuating device for said support device comprises in combination: means for urging said carriage along said first guide in such direction and with such moderate force that said head is slightly pressed against the coils of said band situated between said head and said base plate; a first return spring for urging said head carrier along said second guide toward the axis of rotation of said support; a rack parallel with the axis of said support and rigidly fixed to said head carrier; a cam having a cam drop and rigid with said support as concerns rotation; a slidable push bar capable of a lateral movement which permits inserting said bar between said cam and said rack for the purpose of moving said head carrier away from said support owing to the action of said cam in opposition to the action of said first return spring; a second spring for returning said bar; a locking member for locking said head carrier to said carriage in the position imparted thereto by said cam when said cam drop of said cam leaves said bar and when said bar is returned by said second spring; a resiliently yieldable device adapted to be put under tension during the movement of said head carrier under the effect of said cam and said bar, said yieldable device being so constructed and arranged as to move said carriage and in consequence said head carrier along said first guide in a direction to move said head away from said base plate of said support as soon as said rack has been disengaged from said bar owing to the return movement of the latter; and an abutment on said first guide for releasing said head carrier from said locking member when said head has passed the last coil of said band, whereby to permit said return spring of said head carrier to move the latter along said second guide so as to bring said head back on said last coil.

8. Apparatus as claimed in claim 7, wherein said axis is vertical and said means for urging said guide along its guide consists in the force of gravity, a weight being provided for partially balancing the weight of said carriage and of the devices and members carried by said carriage.

9. Apparatus for respectively recording and reproducing comprising: a very thin flexible recording band extending about an axis in the form of coils thereby providing a helicoid recording surface, said coils ordinarily resting against one another but being capable of separating from one another in a direction parallel with said axis owing to the flexibility of said band, a fixed deck, a support provided on said deck for supporting said band and driving the latter in rotation about said axis, a head for respectively recording and reproducing cooperable with said band, a support device for holding said head in position radially of said axis but permitting said head to move in a direction parallel with said axis, a driving device for effecting between said head and said support, and in consequence the band, a relative movement of rotation about said axis, and coil-separating means extending in a plane substantially perpendicular to said axis and combined with said head, whereby said coils are separated to allow passage of said head between said coils, said support being rotatable and comprising a vertical hollow hub provided with vertical rows of apertures, vertical rows of fingers which are movable radially of and disposed in said hub and capable of protruding outside said hub through said rows of apertures for supporting the coils of said band located above said head, and a device for withdrawing each row of fingers when said row passes in front said head so as to permit the separation at each instant of the two coils of said band passing on either side of said head.

10. Apparatus as claimed in claim 13, wherein rods parallel with the axis of rotation of said hub are fixed in the latter, levers at the ends of which are formed said fingers are pivotally mounted on said rods, springs tend to urge said fingers to protrude from said hub through said rows of apertures in the latter, said device for withdrawing the row of fingers comprising a longitudinal abutment fixed inside said hub which said levers carrying said fingers encounter when the corresponding fingers pass in front of said head.

11. Apparatus as claimed in claim 14, wherein said support device is so constructed and arranged that said head can be withdrawn, by moving it in a direction perpendicular to the axis of the band, from the coils of the latter between which it is engaged, so as to be brought back to one of the ends of the band by passing round the periphery of the latter, said head travelling through a substantially U-shaped path, and there is provided an actuating device for causing said head to travel through said path, and a device for withdrawing all said fingers when said head is withdrawn from said band so as to permit all the coils of said band to bear against one another under the effect of the force of gravity.

12. Apparatus as claimed in claim 14, wherein said device for withdrawing said fingers comprises an arm operatively connected to said actuating device and actuated at the end of the movement of withdrawal of said head from the band, a member fixed to said arm and capable of turning around the axis of said hub when said arm is actuated, rollers carried by said member, and an auxiliary lever keyed to each of said rods carrying said levers provided with said fingers, whereby when said arm is actuated by the actuating device said auxiliary levers are moved by said rollers so as to withdraw said fingers into said hub.

13. A very thin flexible recording band extending about an axis in the form of coils thereby providing a helicoid recording surface, said band consisting of a plurality of helically deformed discs concentrically disposed on said axis, each disc having a central aperture and a split which extends from said aperture to the periphery of the disc and is oblique relative to a radial line extending from said axis, and disc connecting means interconnecting immediately adjacent discs along the edges of said splits.

References Cited in the file of this patent

UNITED STATES PATENTS

| | | |
|---|---|---|
| 794,592 | Dickerson | July 19, 1905 |
| 1,121,239 | Fuller | Dec. 15, 1914 |
| 2,262,732 | Gruber | Nov. 11, 1941 |
| 2,265,879 | Thurm | Dec. 9, 1941 |
| 2,396,563 | Fries | Mar. 12, 1946 |
| 2,430,283 | Epstein | Nov. 4, 1947 |
| 2,498,746 | Walker | Feb. 28, 1950 |
| 2,499,421 | Sampler | Mar. 7, 1950 |
| 2,513,423 | Owens | July 4, 1950 |

FOREIGN PATENTS

| | | |
|---|---|---|
| 37,160 | Austria | Jan. 1, 1909 |
| 699,700 | Great Britain | Nov. 11, 1953 |